United States Patent
Yoshida

(10) Patent No.: US 9,256,398 B2
(45) Date of Patent: Feb. 9, 2016

(54) DEVICE AND METHOD OF INCREASING DYNAMICALLY-TYPED SOFTWARE EFFICIENCY

(71) Applicant: FUJITSU LIMITED, Kawasaki-shi, Kanagawa (JP)

(72) Inventor: Hiroaki Yoshida, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 13/837,231

(22) Filed: Mar. 15, 2013

(65) Prior Publication Data

US 2014/0282381 A1    Sep. 18, 2014

(51) Int. Cl.
    *G06F 9/44*    (2006.01)
(52) U.S. Cl.
    CPC ........................................ *G06F 8/00* (2013.01)
(58) Field of Classification Search
    CPC .............. G06F 8/41; G06F 8/43; G06F 11/36
    USPC ........................................ 717/148, 150, 153
    See application file for complete search history.

(56) References Cited

U.S. PATENT DOCUMENTS

| | | |
|---|---|---|
| 7,340,726 B1 | 3/2008 | Chelf et al. |
| 7,478,367 B2 | 1/2009 | Morgan et al. |
| 2008/0178149 A1* | 7/2008 | Peterson et al. ............... 717/110 |
| 2012/0180025 A1* | 7/2012 | Webb ............................. 717/114 |
| 2013/0067441 A1* | 3/2013 | Lafreniere et al. ............. 717/139 |
| 2013/0205286 A1* | 8/2013 | Barraclough et al. ......... 717/151 |
| 2014/0047423 A1* | 2/2014 | Pizlo et al. ..................... 717/153 |
| 2014/0173556 A1* | 6/2014 | Robatmili et al. ............. 717/115 |

OTHER PUBLICATIONS

L. Peter Deutsch, Allan M. Schiffman, "Efficient implementation of the smalltalk-80 system", Seminar Tracing JITs, Ierox PARC & Fairchild Laboratory for Artificial Intelligence Research, Jan. 1984.

* cited by examiner

*Primary Examiner* — Duy Khuong Nguyen
(74) *Attorney, Agent, or Firm* — Maschoff Brennan

(57) ABSTRACT

According to an aspect of an embodiment, a method of increasing efficiency of a software program may include executing a software program that is developed based on a dynamically-typed programming language. The method may also include determining, during execution of the software program, type information for variables included in the software program. Additionally, the method may include generating a modified software program based on the software program and the type information and distributing the modified software program.

16 Claims, 3 Drawing Sheets

DEVICE AND METHOD OF INCREASING DYNAMICALLY-TYPED SOFTWARE EFFICIENCY

FIELD

The embodiments discussed herein are related to increasing the efficiency of dynamically-typed software.

BACKGROUND

As usage of electronic devices increases, so does the number of software programs that run on these devices. Many of these software programs are developed using a dynamically-typed programming language, which may be referred to as "dynamically-typed software." Code of dynamically-typed software may include variables that do not have their type checked until the software program is run. Accordingly, the type information for the variables may be determined primarily during execution (i.e., at runtime) of the dynamically-typed software. Dynamically-typed languages may allow greater flexibility in programming as compared to statically-typed programming languages. However, due in part to the runtime operations to determine type information of variables in dynamically-typed software, dynamically-typed software may also consume more computing resources of electronic devices than statically typed software.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of increasing efficiency of a software program may include executing a software program that is developed based on a dynamically-typed programming language. The method may also include determining, during execution of the software program, type information for variables included in the software program. Additionally, the method may include generating a modified software program based on the software program and the type information and distributing the modified software program.

The object and advantages of the embodiments described herein will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to methods and systems of increasing efficiency of software that may be based on a dynamically-typed language, which may be referred to hereinafter as "dynamically-typed software." A variable of dynamically-typed software may have a type, such as, for example and without limitation, character, string, integer, float, byte, double, Boolean, pointer, array, structure, an object or instance of a class, and enumeration. A type of a variable indicates what type of data (e.g., actual values) may be assigned to the variable. For example, integer values may be assigned to a variable whose type is integer; and true-false values may be assigned to a variable whose type is Boolean.

Code of dynamically-typed software may include variables that do not have their type checked until the software program is run. Accordingly, the type information for the variables may be determined primarily during execution (i.e., at runtime) of the dynamically-typed software which may increase the use of resources to execute the dynamically-typed software.

As discussed in further detail below, a type-information module may be configured to determine type information for variables included in dynamically typed software before the dynamically typed software is distributed for use by one or more users. This ahead-of-time (AOT) type information determination of the variables may reduce the resources used to perform type checking of the variables during a subsequent execution of the dynamically-typed software.

Embodiments of the present disclosure will be explained with reference to the accompanying drawings.

Figure 1:
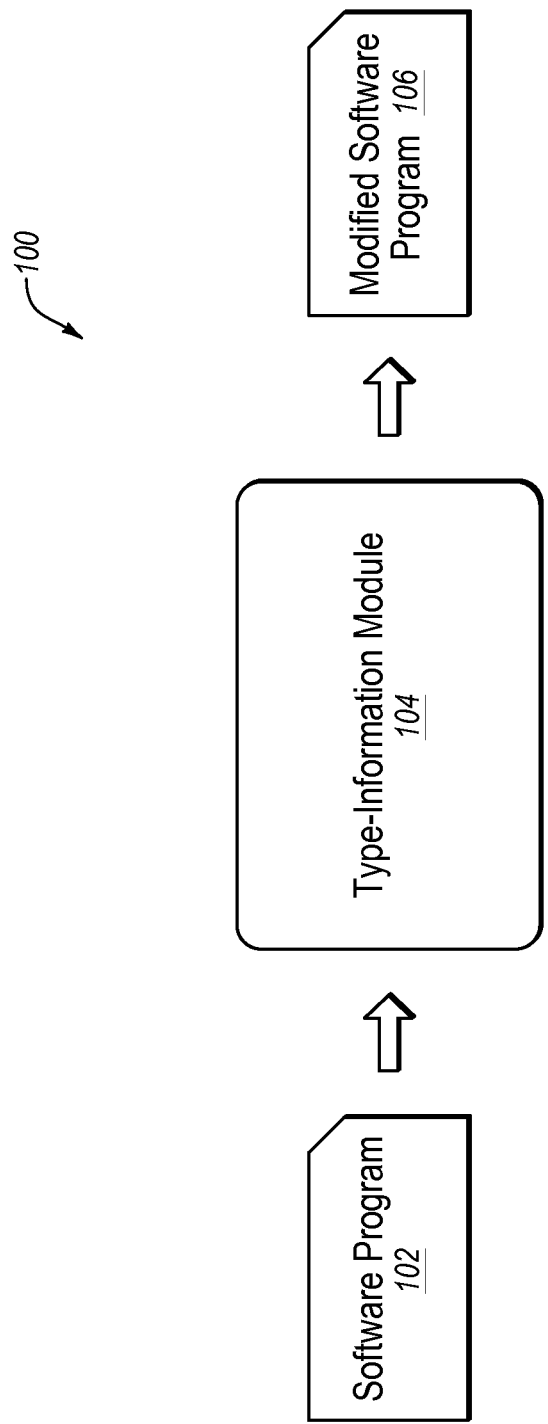
FIG. 1 illustrates an example system of increasing efficiency of dynamically-typed software.

FIG. 1 illustrates an example system 100 for increasing efficiency of a dynamically-typed software program 102 ("the software 102"), arranged in accordance with the least one embodiment described herein. The software 102 may include variables whose types may be checked during execution (or run-time) of the software 102. Additionally, during execution of dynamically typed software, different types may be used for a variable depending on which data structure or path of the dynamically typed software is being executed at the time. Some examples of dynamically-typed software programming languages where variable types may be checked during execution of the software, include but are not limited to, JavaScript, Python, Ruby, MATLAB, Lisp, Lua, and APL.

In some embodiments, a type-information module 104 of the system 100 may be configured to execute the software 102 to determine type information associated with one or more variables of the software 102. In some embodiments, the type-information module 104 may execute the software 102 using a test suite or symbolic execution, as described in further detail below with respect to FIG. 2.

The type information may include information associated with types that may be used for the variables of the software 102 during execution of the software 102. For example, in some embodiments, the type information may include the different types that may be assigned to the variables during execution of the software 102. In these or other embodiments, the type information may include which types may be assigned to the variables during execution of specific paths or data structures of the software 102. Additionally, the type information may include a specific set of instructions that may identify a type associated a variable in a specific path or data structure of the software 102 and that may indicate which operations to perform based on the identified type.

During the execution of the software 102, the type-information module 104 may be configured to determine the type information for the variables included in the software 102 and may also be configured to remember the determined type information for the variables. In some embodiments, the type-information module 104 may be configured to look up type information for a variable of the software 102 when the variable is used during execution of the software 102.

For instance, the type-information module 104 may be configured to lookup type information for a variable of the software 102 when the variable is passed to a function of the software 102 that may be called during execution of the software 102. The type-information module 104 may also be configured to remember the type information of the variable associated with the variable being used by the called function.

Figure 2:
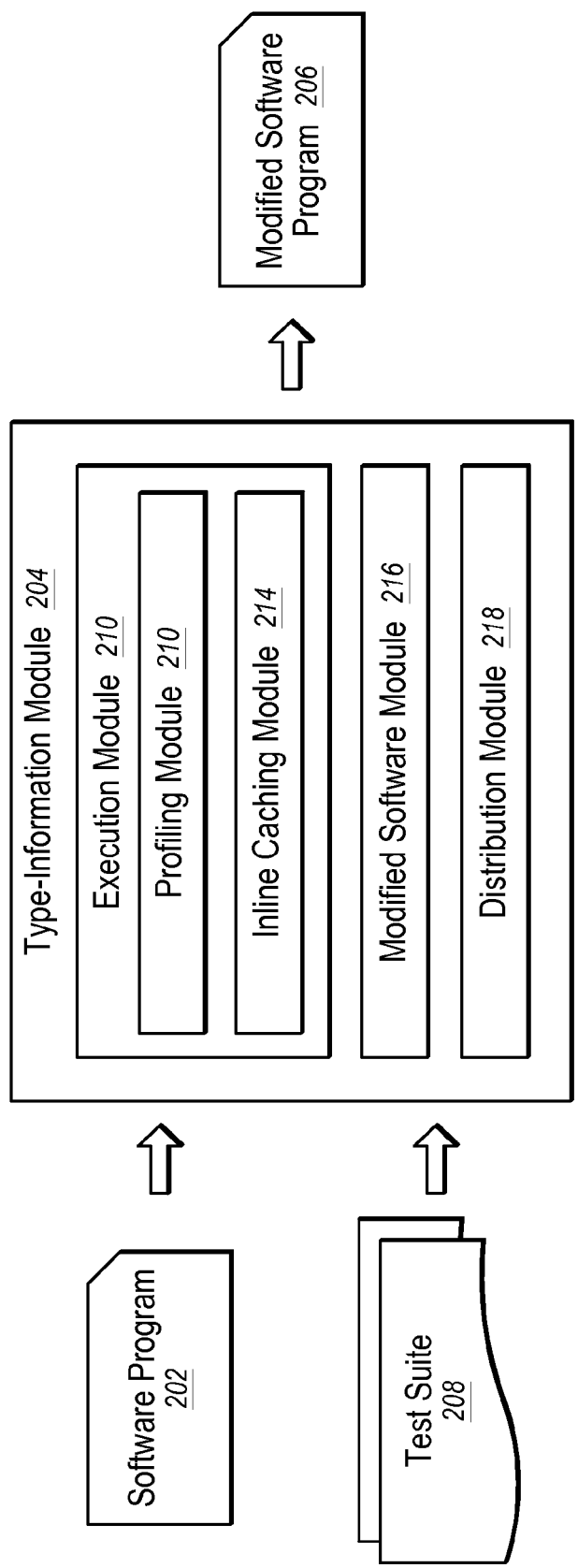
FIG. 2 illustrates an example type-information module configured to increase the efficiency of dynamically-typed software.

As described in further detail with respect to FIG. 2, in some embodiments, the type-information module 104 may be further configured to perform profiling of the software 102 as part of determining the type information. Further, the type information module 104 may be configured to perform in-line caching with respect to the determined type information. As discussed in further detail below with respect to FIG. 2, the type-information module 104 may also be configured to generate a modified dynamically-typed software program 106 ("modified software 106") based on the determined and remembered type information and the software 102. For example, the modified software 106 may include the software 102 with the type information stored therein. Additionally, in some embodiments, the type information module 104 may be configured to generate the modified software 106 based on the in-line caching such that the results of the in-line caching with respect to the software 102 may be stored in the modified software 106. The type-information module 104 may also be configured to store the modified dynamically-typed software 106 such that the modified software 106 may then be distributed to one or more users.

Accordingly, the type-information module 104 may be configured to determine type information for one or more of the variables included in the modified software 106 before the modified software 106 is distributed for use by one or more users—which may be referred to as ahead-of-time type information determination. The type information determined ahead-of-time may reduce the resources used during execution of the modified software 106 as compared to the resources used during execution of dynamically-typed software where type information may not be determined ahead-of-time, such as in the software 102.

FIG. 2 illustrates an example embodiment of a type-information module 204, arranged in accordance with the least one embodiment described herein. In some embodiments, the type-information module 204 may be configured to be analogous to the type-information module 104 of FIG. 1. The type-information module 204 may be implemented by any suitable mechanism, such as a program, software, function, library, software-as-a-service, analog or digital circuitry, or any combination thereof. In some embodiments, the type-information module 204 may be embodied in logic or instructions resident in memory for execution by a processor.

The processor may include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor may interpret and/or execute program instructions and/or process data stored in the memory.

The memory may include any suitable computer-readable media configured to retain program instructions and/or data for a period of time. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by the processor. Combinations of the above may also be included within the scope of computer-readable media. Computer-executable instructions may include, for example, instructions and data that cause a general purpose computer, special purpose computer, or special purpose processing device (e.g., the processor) to perform a certain function or group of functions.

In some embodiments, the type-information module 204 may include an execution module 210. The execution module 210 may be configured to receive and execute a dynamically-typed software program 202 ("software 202"). In some embodiments, the execution module 210 may be configured to execute the software 202 using a received test suite 208 associated with the software 202 and/or by performing symbolic execution with respect to the software 202.

The test suite 208 may be any appropriate set of commands, instructions, and/or concrete values that may be used to initiate one or more operations of the software 202 such that one or more paths of the software 202 may be explored. During the execution of the software 202 using the test suite 208, one or more variables of the software 202 may be called such that type information associated with the variables may be determined. Accordingly, the execution module 210 may be configured to use the test suite 208 to execute the software 202 such that type information associated with one or more variables of the software 202 may be determined.

As mentioned above, in these and other embodiments, the execution module 210 may also be configured to use symbolic execution to execute the software 202. Symbolic execution is a technique for dynamically analyzing a software program. Symbolic execution may use symbolic values instead of concrete values as input values and may represent values of program variables as symbolic expressions. As a result, the outputs computed by a software program that is symbolically executed may be expressed as functions of the symbolic inputs. Through symbolic execution, each path within a software program may be symbolically executed. Whenever symbolic execution along a path terminates (normally or with an error), a path constraint associated with the path may be established.

Accordingly, the execution module 210 may be configured to perform symbolic execution to execute the software 202 such that one or more variables of the software 202 may be called during the symbolic execution of the software 202. The execution module 210 may thus be configured to determine type information associated with one or more of the variables of the software 202 when the variables are called during the symbolic execution of the software 202.

During execution of the software 202 (using the test suite 208 or symbolic execution), the execution module 210 may be configured to determine the type information associated with the variables in the software 202. In some embodiments, the execution module 210 may be configured to perform runtime method binding during execution of the software 202 to determine the type information. Runtime method binding may be used to determine which type may be used for a variable with an unspecified type in a particular instance when the variable is called. For example, during runtime method binding, a dynamic lookup method may be performed for the variable to determine the type for the variable when the variable is called in the particular instance.

As mentioned above, in different instances, for example within different execution paths or data structures of the software 202, a variable may be assigned a different type. As a result, the type information associated with the variables in the software 202 may include one or more types that may be assigned to the variables during execution of the software 202. For example, the type information for a variable may indicate that the variable may be assigned as an integer, double, and/or float type in different execution paths in the software 202.

In some embodiments, the execution module 210 may include an in-line caching module 214 that may be configured to perform in-line caching during execution of the software 202. As discussed in further detail below, in-line caching may be used to store the type information derived from a previously executed dynamic lookup method. The in-line caching may be used to store the type information in a data structure of the software 202 that may be associated with a call site where the previously executed dynamic lookup method may have been performed to determine the type information. Therefore, the type information may be accessed when the call site is subsequently encountered instead of performing another dynamic lookup method to determine the type information. The in-line caching module 214 may be configured to perform any suitable type of in-line caching including monomorphic in-line caching, polymorphic in-line caching, and/or metamorphic in-line caching.

In some embodiments, variables associated with a particular call site of the software 202 (e.g., variables that are passed as arguments to a function at the particular call site) may often have the same type, or a limited number of types, with respect to the particular call site. In-line caching performed by the in-line caching module 214 may be based on this precept such that the type information derived from the results of a dynamic lookup for one or more variables in a particular call site of the software 202 may be stored in-line with the data structure (and its corresponding code) of the software 202 that may be associated with the particular call site. Therefore, when the particular call site is reached again, the type information stored in the data structure associated with the call site may be accessed instead of invoking the dynamic lookup method.

In some embodiments, a modified software module 216 of the type-information module 204 may be configured to generate a modified dynamically-typed software program 206 ("modified software 206"). The modified software 206 may be based on the software 202 and the determined type information. For example, in some embodiments, the modified software module 216 may be configure to store as the modified software 206, the results of the in-line caching of the software 202 such that the modified software 206 may include the software 202 and the type information added to the software 202 during the in-line caching.

In some embodiments, the execution module 210 may also include a profiling module 212 configured to determine profile information associated with the software 202. In some embodiments, the profiling module 212 may be configured to determine the profile information by performing a dynamic program analysis of the software 202 during execution of the software 202. For example, the profiling module 212 may be configured to determine, and include in the profile information, memory or time complexities of the software 202, usage of particular instructions within the software 202, frequency and/or duration of variable uses within the software 202, and/or frequency and/or duration of function calls within the software 202. Additionally, the profiling module 212 may be configured to determine, and include in the profile information, a frequency of use of a variable type during execution of the software 202.

In some embodiments, the execution module 210 may be configured to determine the type information based on the profile information. For example, in some embodiments, the execution module 210 may be configured to prioritize the determination of type information for the variables based on how often the variables are used, as indicated by the profile information. As such, the execution module 210 may prioritize determining the type information for the more frequently used variables over determining the type information for the less used variables.

Additionally, in some embodiments, the execution module 210 may be configured to prioritize the determination of the type information with respect to one or more frequently called functions based on how often the frequently called functions are called, as indicated by the profile information. For example, the execution module 210 may be configured to prioritize determining the type information for one or more variables associated with the frequently called functions over determining the type information for variables associated with rarely called functions.

In these and other embodiments, the in-line caching module 214 may be configured to perform in-line caching with respect to the profile information. For example, the in-line caching module 214 may prioritize which data structures of the software 202 (e.g., data structures associated with call sites of the software 202) to populate with type information based on the frequency of use of the variables associated with the data structures and/or frequency of function calls associated with the data structures that may be included in the profile information. Additionally, in some embodiments, the in-line caching module 214 may prioritize type information for one type of a variable over another type of the variable in an associated data structure that may include the type information for the variable when the profile information indicates that the one type is used more than the another type for the variable.

The modified software module 216 may also be configured to generate the modified software 206 based on the profile information. For example, as described above, the in-line caching module 214 may perform in-line caching using the profile information to prioritize which data structures of the software 202 to populate with associated type information. The modified software module 216 may be configured to store the software 202 with the prioritized type information included therein as the modified software 206. Therefore, the modified software 206 may include type information that may be associated with frequently used variables, variable types, and/or function calls that may be included in the profile information.

In some embodiments, the modified software 206 may be stored in a computer readable medium and/or distributed for use or execution at a later time. As mentioned above, the modified software 206 may include the software 202 with the determined type information stored therein. Therefore, the modified software 206 may perform operations based on type information stored in the modified software 206 that may have been determined ahead-of-time, which may reduce the resources used during the execution of the modified software 206. Additionally, the ahead-of-time in-line caching that may be performed to generate the modified software 206 may reduce or eliminate the amount of just-in-time in-line caching that may be performed during execution of the modified software 206. Therefore, the processing resources used to execute the modified software 206 may be reduced as compared to the processing resources used to execute the software 202.

Modifications, additions, or omissions may be made to FIGS. 1 and 2 without departing from the scope of the present disclosure. For example, one or more of the modules of the type-information module 204 may be combined, or separated into additional modules. The distinction between modules is merely to facilitate an understanding of different functions that may be performed by the type-information module 204.

Figure 3:
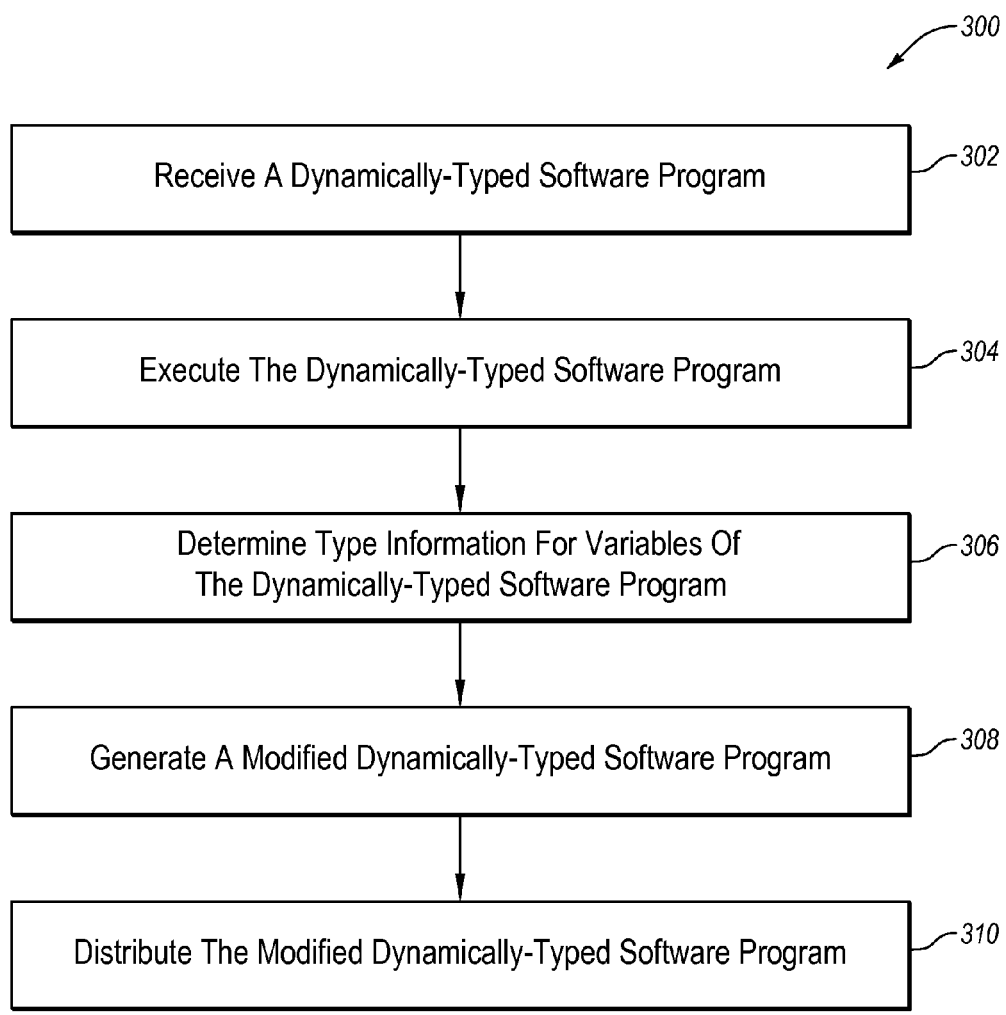
FIG. 3 is a flow chart of an example method of increasing efficiency of dynamically-typed software.

FIG. 3 is a flow chart of an example method 300 of increasing efficiency of a dynamically-typed software program, arranged in accordance with at least one embodiment described herein. The method 300 may be implemented, in some embodiments, by a type-information module, such as the type-information modules 104 and 204 of FIGS. 1 and 2, respectively. Although illustrated as discrete blocks, various blocks may be divided into additional blocks, combined into fewer blocks, or eliminated, depending on the desired implementation.

The method 300 may begin, and at block 302, a dynamically-typed software program (referred to hereinafter as "the software program") may be received. At block 304, the software program may be executed. As described above, in some embodiments, the software program may be executed using a test suite. In these or other embodiments, the software program may be executed using symbolic execution.

At block 306, type information for variables included in the software program may be determined during execution of the software program. For example, as described above, the type information may be determined using runtime method binding. In some embodiments, the type information for the variables may be stored in data structures associated with call sites of the software program that may use the variables. In some embodiments, the type information may be stored in the associated data structures using in-line caching, as described above.

At block 308, a dynamically-typed modified software program (referred to hereinafter as "the modified software program") may be generated based on the software program and the type information. For example, as described above, the software program with the type information stored therein may be stored as the modified software program to generate the modified software program.

At block 310, the modified software program may be distributed and/or stored for execution at a later time. As mentioned above, the modified software program may include type information for variables included in the modified software program that may have been determined ahead-of-time during a previous execution of the software received at block 302. Additionally, the inclusion of the type information in the modified software may reduce the amount of in-line caching performed during execution of the modified software program as compared to the amount of in-line caching that may be performed during execution of the software program received at block 302. Consequently, the amount of resources used to execute and run the modified software program may be reduced as compared to the amount of resources used to execute and run the software program received at block 302. Therefore, the method 300 may be used to increase the efficiency of a dynamically-typed software program.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments For example, in some embodiments, the method 300 may include steps related to profiling the software program received at block 302 to determine profile information associated with the software program. In some of these embodiments, the profile information may be used to determine the type information. For example, the profile information may be used to determine which variables and/or variable types may be frequently called such that determination of the type information associated with these variables may be prioritized accordingly.

The embodiments described herein may include the use of a special purpose or general-purpose computer including various computer hardware or software modules, as discussed in greater detail below.

Embodiments described herein may be implemented using computer-readable media, such as that described above, for carrying or having computer-executable instructions or data structures stored thereon. Such computer-readable media may be any available media that may be accessed by a general purpose or special purpose computer.

As used herein, the term "module" or "component" may refer to hardware, and/or software objects or routines that execute on the computing system. The different components, modules, engines, and services described herein may be implemented as objects or processes that execute on the computing system (e.g., as separate threads). While the system and methods described herein are described as possibly being implemented in software, implementations in hardware or a combination of software and hardware are also possible and contemplated.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the present disclosure.

What is claimed is:

1. A method of increasing efficiency of a software program, the method comprising:

executing a software program that is developed based on a dynamically-typed programing language;

determining, during execution of the software program, type information for one or more variables included in the software program, the determining type information including:

profiling the software program to determine a frequency of use for each of the one or more variables in the software program, wherein the one or more variables include a first variable associated with a first frequency of use in the software program and a second variable associated with a second frequency of use in the software program;

determining the type information for the one or more variables based on the frequency of use for each of the one or more variables, wherein determining the type information includes prioritizing, in response to the first frequency of use being greater than the second frequency of use, determining the type information for the first variable over the second variable; and
profiling the software program to determine a frequency of function calls with respect to a plurality of data structures of the software program;
determining one or more data structures from the plurality of data structures to populate with the type information based on one or more of the following: the frequency of use for each of the one or more variables with respect to the plurality of data structures and the frequency of function calls with respect to the plurality of data structures;
generating a modified software program based on the software program, the type information, and the determination of the one or more data structures, the generating of the modified software program including population of the one or more data structures with the type information in response to determining the one or more data structures; and
distributing the modified software program.

2. The method of claim 1, wherein generating the modified software program includes storing the type information for the one or more variables in data structures of the software program, each of the data structures being associated with a call site of the software program that uses at least one of the one or more variables.

3. The method of claim 1, further comprising:
determining a frequently-used function of the software program based on the profiling of the software program; and
determining the type information for at least one of the one or more variables in the software program based on the at least one variable being included in the frequently-used function.

4. The method of claim 1, further comprising:
determining a frequency of use of a variable type during execution of the software program based on profiling the software program; and
determining the type information based on the frequency of use of the variable type.

5. The method of claim 1, further comprising performing runtime method binding to determine the type information.

6. The method of claim 1, further comprising performing in-line caching to store the type information for the one or more variables in data structures of the software program, each of the data structures being associated with a call site of the software program that uses at least one of the one or more variables.

7. The method of claim 1, further comprising performing symbolic execution of the software program to execute the software program.

8. The method of claim 1, further comprising applying a test suite to the software program to execute the software program.

9. A processor configured to execute computer instructions from a computer readable medium to cause a system to perform operations to increase efficiency of a software program, the operations comprising:
executing a software program that is developed based on a dynamically-typed programing language;
determining, during execution of the software program, type information for one or more variables included in the software program, the determining type information including:
profiling the software program to determine a frequency of use for each of the one or more variables in the software program, wherein the one or more variables include a first variable associated with a first frequency of use in the software program and a second variable associated with a second frequency of use in the software program;
determining the type information for the one or more variables based on the frequency of use for each of the one or more variables, wherein determining the type information includes prioritizing, in response to the first frequency of use being greater than the second frequency of use, determining the type information for the first variable over the second variable; and
profiling the software program to determine a frequency of function calls with respect to a plurality of data structures of the software program;
determining one or more data structures from the plurality of data structures to populate with the type information based on one or more of the following: the frequency of use for each of the one or more variables with respect to the plurality of data structures and the frequency of function calls with respect to the plurality of data structures;
generating a modified software program based on the software program, the type information, and the determination of the one or more data structures, the generating of the modified software program including population of the one or more data structures with the type information in response to determining the one or more data structures; and
distributing the modified software program.

10. The processor of claim 9, wherein generating the modified software program includes storing the type information for the one or more variables in data structures of the software program, each of the data structures being associated with a call site of the software program that uses at least one of the one or more variables.

11. The processor of claim 9, wherein the operations further comprise:
determining a frequently-used function of the software program based on the profiling of the software program; and
determining the type information for at least one of the one or more variables in the software program based on the at least one variable being included in the frequently-used function.

12. The processor of claim 9, wherein the operations further comprise:
determining a frequency of use of a variable type during execution of the software program based on profiling the software program; and
determining the type information based on the frequency of use of the variable type.

13. The processor of claim 9, wherein the operations further comprise performing runtime method binding to determine the type information.

14. The processor of claim 9, wherein the operations further comprise performing in-line caching to store the type information for the one or more variables in data structures of the software program, each of the data structures being associated with a call site of the software program that uses at least one of the one or more variables.

15. The processor of claim 9, wherein the operations further comprise performing symbolic execution of the software program to execute the software program.

16. The processor of claim 9, wherein the operations further comprise applying a test suite to the software program to execute the software program.

\* \* \* \* \*